3,062,752
DIMENSIONALLY STABLE EXPANDED PERLITE AND METHOD FOR MAKING THE SAME
Kenneth R. Larson, Mount Prospect, Ill., assignor to United States Gypsum Company, Chicago, Ill., a corporation of Illinois
No Drawing. Filed May 2, 1958, Ser. No. 732,463
6 Claims. (Cl. 252—378)

The present invention relates to an expanded perlite product resistant to dimensional change, and the method for making the same. More particularly, the subject invention pertains to expanded perlite dimensionally stabilized against expansion due to the absorption of water vapor and the method of producing the same.

Perlite is a volcanic glass having a large number of practical uses, particularly in materials of construction. Perlite is generally processed by being crushed to desired particle size, after which it is heated at elevated temperatures. In the course of the heat treatment the mineral becomes plastic and a small percentage of combined water is evolved, producing a vesicular structure and an attendant increase in volume and decrease in density. The resulting lightweight mass has found widespread use in acoustical tile and various calcined gypsum compositions.

Thus, perlite has become steadily more important in recent years as its desirable properties have been discovered and as more and more commercial applications for utilizing these desirable properties have been developed.

It has been found that test bars prepared from gypsum plaster and expanded perlite will, if unrestrained, tend to show a slight gradual increase in dimensions on long time exposure to service conditions, particularly when those conditions involve high temperatures and humidities. It is likely that this tendency has been at least partially responsible for the fact that expanded perlite has not achieved significant commercial acceptance as an aggregate in casting compositions and cast objects where continued dimensional accuracy in service is of importance. It is obvious that increased markets for expanded perlite would be available were it possible to effect an improvement in this property.

It is an object of this invention, therefore, to provide an expanded perlite product which has improved stability against dimensional change in service.

It is another object of this invention to provide a method for forming dimensionally stable expanded perlite.

The above and other objects of this invention will become more apparent from the following detailed description and appended claims.

Initial theories to account for this behavior naturally supposed that water was involved in the expansion mechanism. However, it was quickly discovered that soaking expanded perlite in water, even for extended periods of time, or at temperatures up to the boiling point, failed to change the expansion behavior. Thus, the problem was not so simple as it at first appeared. It has now been discovered that the key to successful stabilization of expanded perlite lies in what might be likened to a reconstitution of the original perlite ore, at least insofar as water content is concerned. In fact, under certain conditions the expanded perlite may be caused to combine, with varying degrees of tenacity, with even more water than was present in the original ore from which the expanded perlite was prepared. It has also been found that complete return of the amount of water originally present is not required to secure commercially attractive results. This reconstitution of the expanded perlite to a condition, as to water, somewhat approximating that of the original ore is effected by exposing the expanded perlite, not to water, but to water vapor, for periods of time which will vary with the temperature of treatment and the water vapor concentrations, the higher temperatures and water vapor concentrations requiring the shorter times.

In one embodiment of the invention provided, expanded perlite was placed in an autoclave and subjected to steam under a pressure of 300 p.s.i.g. for three hours. At the end of the autoclaving period the perlite was utilized in the proportion of 4 cubic feet per 100 pounds of calcined gypsum in the formation of a test bar having the dimension of 1" x 1" x 10". After the plaster had set, the test bar was placed in a cabinet maintained under atmospheric pressure and at a temperature of 90° F. and 90% relative humidity. After 17 months the bar was measured and an expansion of .074% was revealed.

It will be appreciated that expanded perlite alone is a free flowing material composed of discrete vesicular particles of generally spherical shape and that measurement of dimensional movement of such particles per se would be a very difficult analytical task. For convenience, therefore, the perlite particles are embedded in a matrix to provide a unitary object readily susceptible of measurement. Gypsum plaster serves as a convenient matrix material.

A similar bar prepared in precisely the same manner and subjected to the same humidity test but employing untreated expanded perlite revealed an expansion of .271% at the end of 17 months.

It is seen, therefore, that the pretreatment of expanded perlite whereby water in the form of vapor re-enters the perlite, provides an expanded perlite product which has improved stability against dimensional change upon being subjected to a humid atmosphere.

In view of the fact that the examples hereinafter disclosed employ apparatus well known in the art, the drawing has been dispensed with, as it is believed to be unnecessary. The autoclaves employed in the course of carrying out the following examples are of a type well known in the art and are possessed of no peculiarities of construction.

SUBJECTING EXPANDED PERLITE TO STEAM AT ATMOSPHERIC PRESSURE

In addition to the discovery that water vapor will be absorbed by expanded perlite, it has also been discovered that expanded perlite if treated with steam at atmospheric pressure will have a portion of its water need satisfied, and as a result such perlite will have improved dimensional stability when employed for any one of its numerous uses.

Expanded perlite was treated by passing steam therethrough at atmospheric pressure for 10 minutes. Plaster mixes employing 4 cubic feet of the treated expanded perlite per 100 pounds of calcined gypsum were made, and a similar type plaster mix was made from untreated expanded perlite and calcined gypsum in the same ratio. The 1" x 1" x 10" test bars were then cast from these prepared plaster mixes. After 11 weeks exposure to an atmosphere containing 90% relative humidity and maintained at a temperature of 90° F., the plaster made with the steam-treated expanded perlite showed an expansion of .149% compared with .253% for the plaster specimen made with the untreated expanded perlite.

It is thus seen that steam comprises one means of satisfying the water requirements of expanded perlite. By extending the time of steam-perlite contact, the amount of water absorbed by the perlite will increase, and as a result such treated expanded perlite will be even more dimensionally stable against high humidity conditions to which exposed subsequently. Even short periods of exposure of the perlite to steam, however, tend to increase the stability of the same against subsequent dimensional change.

SUBJECTING EXPANDED PERLITE TO STEAM UNDER PRESSURE

One of the more effective means for pretreating expanded perlite prior to use in an application such as a plaster mix comprises subjecting the expanded perlite to steam under pressure. The following table summarizes the results obtained by pretreating expanded perlite under various pressure and time conditions.

Table I

| Autoclave pressure, p.s.i.g. | Perlite conditioning time | Cu. ft. perlite per 100 lbs. calcined gypsum in test specimen | Treatment of perlite before mixing into plaster | Expansion of test specimens Percent | Expansion of test specimens Time, mos. |
|---|---|---|---|---|---|
| 300 | 3 hrs | 4 | Used wet | .074 | 17 |
| 300 | 3 hrs | 4 | ...do | .070 | 17 |
| 0 | 0 hrs | 4 | Control | .271 | 17 |
| 100 | 1 hr | 4 | Dried at 110° F. | 1.049 | 6 |
| 0 | 0 hrs | 4 | Control | [1].124 | 6 |
| 300 | 6 hrs | 3 | Used hot and wet. | .032 | 17 |
| 50 | 10 min | 3 | ...do | .118 | 17 |
| 50 | 40 min | 3 | ...do | .107 | 17 |
| 50 | 160 min | 3 | ...do | .050 | 17 |
| 0 | 0 min | 3 | Control | .381 | 17 |
| 40 | 18 hrs | 3 | Used hot and wet. | .082 | 14 |
| 0 | 0 hrs | 3 | Control | .312 | 14 |
| 40 | 18 hrs | 3 | Used hot and wet. | .065 | 14 |
| 0 | 0 | 3 | Control | .248 | 14 |

[1] Conditioned at 90° F. and 65% relative humidity. All others at 90° F.—90% R.H.

It is quite evident from the above table that autoclaving with steam is a very effective method of substantially preventing subsequent dimensional change of a plaster containing expanded perlite.

In Table I the legends "used wet," "dried at 110° F.," and "used hot and wet" refer to the condition of the perlite as it is mixed into the plaster from which the test specimen is formed; the wet condition resulted from the condensed steam which formed following the autoclaving operation.

SUBJECTING EXPANDED PERLITE TO AN ATMOSPHERIC MIXTURE OF STEAM AND AIR

It has also been found that expanded perlite when subjected to a mixture of steam and air under pressure will become dimensionally stable to a degree depending upon conditions of treatment.

In one example expanded perlite and 2.5% by weight of water were placed in an externally heated autoclave. Compressed air was introduced into the autoclave to raise the pressure therein to 50 p.s.i.g. After 82 minutes the externally applied heat was stopped, and the pressure condition within the autoclave at this time was 70 p.s.i.g. and the temperature 300° F. In a total time of 100 minutes the temperature within the autoclave rose to 340° F. The autoclave was cooled and the expanded perlite removed. The expanded perlite upon removal was found to be in a dried condition, inasmuch as all the water which had been originally inserted in the autoclave was vaporized and absorbed by the expanded perlite.

A plaster mix using a ratio of 4 cubic feet of the treated expanded perlite per 100 pounds of calcined gypsum was made, and 1" x 1" x 10" specimen bars were formed therefrom. After subjecting the specimen bars to an atmosphere containing 65% relative humidity and maintained at a temperature of 90° F. for a period of 4½ months, such bars showed a dimensional change or growth of only .105%. Control bars subjected to the same test conditions but formed with untreated expanded perlite revealed a growth or dimensional change of .246% at the end of the 4½ month period. The foregoing example is illustrative, therefore, of the fact that air in the expanded perlite surrounding atmosphere is not detrimental to the water-absorbing process taking place when the expanded perlite is subjected to water in vapor form.

SUBJECTING EXPANDED PERLITE TO SUPERHEATED STEAM AT ATMOSPHERIC PRESSURE

Table II depicts the effect of subjecting expanded perlite to superheated steam at atmospheric pressure for the temperatures and periods of time indicated in the table.

Table II

| Treatment of Perlite | Dimensional change, percent |
|---|---|
| Superheated steam at 450° F. for 15 min | 0.103 |
| Superheated steam at 450° F. for 90 min | 0.077 |
| Superheated steam at 450° F. for 3 hours | 0.045 |
| Superheated steam at 450° F. for 15 min., after perlite heated to 200° F | 0.111 |
| Superheated steam at 300° F. for 15 min | 0.110 |
| Superheated steam at 300° F. for 3 hours | 0.067 |
| Steamed at 200° F. for 15 min | 0.117 |
| Control, not treated | 0.137 |

The treated expanded perlite was incorporated in a plaster mix containing 4 cubic feet of the expanded perlite per 100 pounds of plaster. Specimen bars 1" x 1" x 10" cast from the plaster mixture were exposed for one month at 90° F. to an atmosphere containing 90% relative humidity. The right-hand column in Table II indicates the percent dimensional change in the cast specimens incorporating the expanded perlite treated in accordance with the conditions set forth in the left-hand portion of Table II. The effectiveness of treating expanded perlite with superheated steam will be noted by comparing the percent of dimensional change of those test specimens employing treated expanded perlite with the control specimen employing untreated expanded perlite. It will be noted from Table II that with an increase in temperature condition present in the expanded perlite treating process and with an increase in time in the expanded perlite treating process more water is absorbed by the expanded perlite, and as a result such expanded perlite becomes more dimensionally stable.

DRYING TREATED EXPANDED PERLITE FOLLOWING THE EXPOSURE OF SUCH EXPANDED PERLITE TO WATER VAPOR

It appears that elevated-temperature drying of autoclaved expanded perlite resulting from a treating process in which expanded perlite is subjected to steam under pressure reduces the effectiveness of the autoclave treatment.

Table III

| Autoclave pressure, p.s.i.g. | Autoclave time, hr. | Drying conditions Not dried | Drying conditions 110° F. | Drying conditions 200° F. |
|---|---|---|---|---|
| | | Dimensional change, percent | | |
| 100 | 1 | 0.021 | 0.022 | 0.036 |
| 100 | 2 | 0.014 | 0.016 | 0.041 |
| 100 | 3 | 0.021 | 0.020 | 0.045 |
| 200 | 1 | 0.013 | 0.018 | 0.050 |
| 200 | 2 | 0.019 | 0.021 | 0.060 |
| 200 | 3 | 0.010 | 0.028 | 0.069 |
| 300 | 1 | | [1]0.018 | [1]0.036 |
| 300 | 2 | | [1]0.018 | [1]0.043 |
| 300 | 3 | | [1]0.022 | [1]0.032 |
| 300 | 4 | | [1]0.024 | [1]0.048 |

[1] Exposed to 90° F.—90% relative humidity for 12 days. A plaster composition made from nontreated perlite showed a growth of 0.050% for the same length of time.

In Table III the dimensional change in test specimens or bars having the dimensions 1" x 1" x 10" are set forth. These specimens were prepared from expanded perlite which was treated in the manner indicated in the left-hand portion of Table III, wherein the autoclaving pressures and times are indicated.

The test specimens formed employed 4 cubic feet of the treated expanded perlite per 100 pounds of calcined gypsum plaster, and the mixture was then gauged with water. The test specimens were conditioned at a temperature of 90° F. and a relative humidity of 90% for 20 days except as otherwise noted. The test was started 2 hours after the mortar had set in the individual specimens.

It will be noted that drying the conditioned-expanded perlite at 110° F. prior to subjecting the specimens in which such dried perlite is employed to the humidity and temperatures above set forth did not improve the dimensional stability of the specimens. It appears that in many instances the dimensional stability was slightly worsened. Drying the treated expanded perlite at 200° F. prior to formation of the test specimens resulted in inferior dimensional stability of the test specimens formed therefrom when compared with those test specimens employing the treated expanded perlite which was not dried. It appears, therefore, that if the treated expanded perlite is to be dried prior to formation of a plaster mix or prior to use in some other application, care should be taken to insure the fact that the drying temperature is less than 200° F.

MOISTURE LOSS OF VARIOUS PERLITE FORMS AT ELEVATED TEMPERATURES

In subjoined Table IV, results are tabulated which graphically illustrate the increasing moisture loss of various forms of perlite at elevated temperatures. In addition to tabulating moisture loss of expanded and unexpanded perlite upon subjecting the same to elevated temperatures for definite periods of time, Table IV in addition discloses moisture loss of expanded and unexpanded perlite forms heated stepwise to constant weight.

It will be noted that at temperatures below 150° F. the percentage by weight of moisture lost by the perlite is rather small. Consequently perlite should not be dried at a temperature substantially above 150° F. It will be further noted from Table IV that by autoclaving expanded perlite under the conditions set forth, water vapor is absorbed in percentages by weight in excess of those which would normally be retained by the perlite in its natural state. It appears from Table IV, therefore, that the treatment provided by this invention is capable of supplying expanded perlite with a percentage of water in excess of that which is present in perlite in its normal unexpanded state.

*Table IV*

Moisture Analyses of Perlite

|  | Expanded perlite, percent | Expanded perlite, autoclaved, 125 p.s.i.g., for 6 hrs., dried 24 hrs. 150° F., percent | Perlite in natural state, percent |
|---|---|---|---|
| Weight loss at 100° F., 2 hr | 0.02 | 0.02 | 0.04 |
| Weight loss at 100° F., 6 hr | 0.02 | 0.03 | 0.05 |
| Weight loss at 100° F., 24 hr | 0.03 | 0.04 | 0.05 |
| Weight loss at 150° F., 4 hr | 0.07 | 0.19 | |
| Weight loss at 150° F., 24 hr | 0.10 | 0.31 | |
| Weight loss at 200° F., 4 hr | 0.20 | 0.31 | |
| Weight loss at 200° F., 24 hr | 0.28 | 0.63 | |
| Weight loss at 215–220° F., 24 hr | 0.32 | 0.79 | 0.18 |
| Weight loss at 250° F., 24 hr | 0.38 | 1.2 | 0.24 |
| Weight loss at 320° F., 24 hr | 0.58 | 2.07 | 0.62 |
| Weight loss at 500° F., 5 hr | 0.82 | 2.61 | 1.76 |
| Weight loss at 500° F., 70 hr | 0.82 | 2.80 | 2.46 |
| Loss on ignition at 900° C. (1652° F.) | 1.26 | 3.56 | 3.32 |
| Loss on stepwise heating to constant weight: | | | |
| To 100° F | 0.02 | 0.02 | 0.04 |
| From 100° F. to 150° F | 0.08 | 0.12 | 0.05 |
| From 150° F. to 200° F | 0.18 | 0.48 | 0.05 |
| From 200° F. to 500° F | 0.58 | 2.26 | 2.30 |
| Total loss stepwise to 500° F | .86 | 2.88 | 2.44 |

The foregoing examples disclose many methods whereby expanded perlite may reacquire combined water which it had previously lost as a result of being subjected to elevated temperatures in the course of an expanding process. As has been before mentioned, the water to which the expanded perlite is subjected should be in gaseous or vapor form. It has also been shown that the water is more readily absorbed with increasing temperatures. It also appears that pressure conditions assist the absorption of water by the expanded perlite.

It is well known that the perlite rock differs in composition depending upon the geographical location from which extracted. Accordingly the percentage of combined water also varies with the particular perlite involved, and as a result varying quantities of water of the different perlite rocks are lost in the course of the expanding process. Consequently it is believed apparent that the water vapor treatment necessary to insure dimensional stability for a particular perlite is best determined by test, after which the precise desired expanded perlite treating conditions may be determined, for instance, if a commercial process is to be carried out. Such determination, however, requires nothing other than the ordinary skill of the art in view of the disclosure which has been above made.

The various conditions present in the course of treating expanded perlite disclose the flexibility of the provided invention to meet various conditions and physical situations. It has been shown that by increasing temperatures and pressures the expanded perlite becomes increasingly stable against subsequent dimensional changes and as a result a more efficient commercial operation is possible by using pressure and high temperature conditions. Such increased stability may not be due solely to acquisition of water but may also be attributable at least in part to some other physical or chemical reaction which occurs.

It may be possible to treat expanded perlite immediately following the expanding operation and while at an elevated temperature with water in spray form. The high temperature of the expanded perlite particles will vaporize the water in liquid form so that the latter assumes a gaseous state, in which state the same may be absorbed by the expanded perlite. Such a method enables the heat in the expanded perlite immediately following the expanding operation to be utilized for purposes of changing a water spray into steam and concomitantly enables the expanded perlite itself to become cooled. It is believed that such a process has the advantage of providing savings in steam costs.

Although expanded perlite has been described as being used in connection with calcined gypsum in plaster, it should be understood that many applications are possible for the dimensionally stable product above described. It is apparent that the dimensionally stable expanded perlite above disclosed may be used to advantage in any application where the dimensional stability of such expanded perlite is a desired property.

The invention is to be limited only by the scope of the appended claims.

I claim:

1. The process of stabilizing expanded perlite against subsequent dimensional change from exposure to atmospheric conditions, comprising subjecting a charge of said expanded perlite to a steam atmosphere having a temperature of at least 212° F. for a period of at least ten minutes.

2. The process of claim 1 in which said steam is at atmospheric pressure.

3. The process of claim 1 in which said steam is at superatmospheric pressure.

4. The process of claim 1 in which said steam is superheated steam.

5. The process of stabilizing expanded perlite against subsequent dimensional change from exposure to atmospheric conditions comprising subjecting a charge of said expanded perlite to a steam atmosphere having a temperature of at least 212° F. for a period of at least ten minutes and subsequently drying the thus-treated expanded perlite at a temperature below 200° F.

6. A dimensionally stable perlite product made in accordance with the process of claim 1.

References Cited in the file of this patent

UNITED STATES PATENTS

| | | |
|---|---|---|
| 2,517,235 | Pierce | Aug. 1, 1950 |
| 2,639,269 | Dube | May 19, 1953 |